(12) United States Patent
Park et al.

(10) Patent No.: US 10,760,353 B2
(45) Date of Patent: Sep. 1, 2020

(54) TRANSMISSION ASSEMBLY FOR DOWNHOLE MOTOR

(71) Applicant: Halliburton Energy Services, Inc., Houston, TX (US)

(72) Inventors: Steven W. Park, Edmonton (CA); Geoffrey A. Samuel, Edmonton (CA); Hamid Sadabadi, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 255 days.

(21) Appl. No.: 15/753,199

(22) PCT Filed: Sep. 16, 2015

(86) PCT No.: PCT/US2015/050397
§ 371 (c)(1),
(2) Date: Feb. 16, 2018

(87) PCT Pub. No.: WO2017/048247
PCT Pub. Date: Mar. 23, 2017

(65) Prior Publication Data
US 2018/0238119 A1 Aug. 23, 2018

(51) Int. Cl.
*E21B 17/042* (2006.01)
*E21B 4/00* (2006.01)
(Continued)

(52) U.S. Cl.
CPC .......... *E21B 17/042* (2013.01); *E21B 4/003* (2013.01); *E21B 4/02* (2013.01); *E21B 17/046* (2013.01); *F16L 15/06* (2013.01); *F16L 15/08* (2013.01)

(58) Field of Classification Search
CPC ........ E21B 17/042; E21B 17/046; E21B 4/02; E21B 4/003; F16L 15/08; F16L 15/06
See application file for complete search history.

(56) References Cited

U.S. PATENT DOCUMENTS 4,295,535 A * 10/1981 Crase ....................... E21B 4/00
175/101
5,549,336 A    8/1996 Hori et al.
(Continued)

FOREIGN PATENT DOCUMENTS

CA    2478594 A1    9/2003

OTHER PUBLICATIONS

International Search Report and Written Opinion dated Feb. 15, 2016, for PCT Application No. PCT/US2015/050397 filed on Sep. 16, 2015.

*Primary Examiner* — Brad Harcourt
(74) *Attorney, Agent, or Firm* — Chamberlain Hrdlicka (57) ABSTRACT

Methods and apparatus are disclosed for coupling components within a downhole motor drivetrain, and particularly to improving the torque carrying characteristics through threaded couplings in the drivetrain that extends between the mud motor and the drill bit. The described downhole motor drivetrain includes one or more threaded couplings, with each coupling configured to define a gap to accept a spacer having a dimension within a range of sizes. The dimension of the selected spacer placed in the threaded coupling facilitates establishing a desired balance of the force loading at each of two contact regions of the coupling. In many examples, the two contact regions of the coupling will be located on opposite sides of the threaded region.

23 Claims, 5 Drawing Sheets

(51) Int. Cl.
    *E21B 4/02*          (2006.01)
    *E21B 17/046*     (2006.01)
    *F16L 15/06*      (2006.01)
    *F16L 15/08*      (2006.01)

(56) References Cited

U.S. PATENT DOCUMENTS

| | | |
|---|---|---|
| 5,725,061 A | 3/1998 | Van Steenwyx et al. |
| 5,908,212 A | 6/1999 | Smith et al. |
| 7,988,205 B2 | 8/2011 | Mallis et al. |
| 8,052,176 B2 | 11/2011 | Shears et al. |
| 8,827,316 B2 | 9/2014 | Raczynski et al. |
| 2002/0033603 A1 | 3/2002 | Pallini, Jr. et al. |
| 2011/0012347 A1 | 1/2011 | Pacheco |
| 2013/0043874 A1 | 2/2013 | Clark et al. |
| 2013/0277116 A1 | 10/2013 | Knull et al. |

\* cited by examiner

TRANSMISSION ASSEMBLY FOR DOWNHOLE MOTOR

BACKGROUND

The present disclosure relates generally to methods and apparatus for forming a transmission assembly for a downhole motor; and more specifically relates to methods and apparatus for coupling components in the transmission assembly together in a manner which assists in the transmission assembly having capability of communicating high torque loads as may be experienced in some drilling operations.

The use of positive displacement-type mud motors in downhole operations presents significant challenges to the design and configuration of a transmission assembly as it must receive the eccentric rotation of a conventional mud motor rotor, and translate that rotation to a concentric, or single axis, rotation, as may be used most easily to rotate a drill bit or other cutting implement. Transmission assemblies typically use a driveshaft with a sufficient degree of strength and flexibility to follow an orbital path proximate the coupling to the rotor of the mud motor, but to rotate relative to a single axis at a second end proximate a bearing assembly which serves, in part, to secure the single axis of rotation proximate the second end of the driveshaft.

The design and configuration of the motor transmission assembly are further complicated where mud motors will be used in potentially high stress applications, which can include motors with high force output, motors used in deep wells with potentially heavy loading on the drill bit, etc. These conditions can place exceptional strain on all components in the system, including the mud motor and associated transmission assembly. Practical issues of assembly/disassembly, transport, and repair of components in the downhole motor transmission assembly require the use of multiple components to form the drivetrain of the transmission assembly. The configuration and capabilities of the coupling connections used to connect the components forming the transmission drivetrain become of significant importance in forming a mud motor assembly with the capability of handling these extreme conditions: and new methods and apparatus for forming a motor transmission assembly are the subject of this application.

DETAILED DESCRIPTION

The present disclosure describes new methods and apparatus for coupling components within a downhole motor transmission assembly, and particularly to improving the torque carrying characteristics through threaded couplings in the transmission assembly or the remainder of the drivetrain that extends between the mud motor and the drill bit. As described in more detail below the downhole motor drivetrain is configured to be assembled with one or more threaded couplings, with each coupling configured to define a gap to accept a spacer having a dimension within a range of sizes. The use of these spacers in the threaded coupling facilitates establishing a desired balance of the force loading at each of two contact regions of the coupling. Commonly, but not necessarily, the two contact regions of the coupling will be located on opposite sides of the threaded region of the coupling.

The following detailed description describes example embodiments of the new mud motor transmission assembly structure with reference to the accompanying drawings, which depict various details of examples that show how the disclosure may be practiced. The discussion addresses various examples of novel methods, systems and apparatus in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternatives specifically discussed herein may be made without departing from the scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

Figure 1:
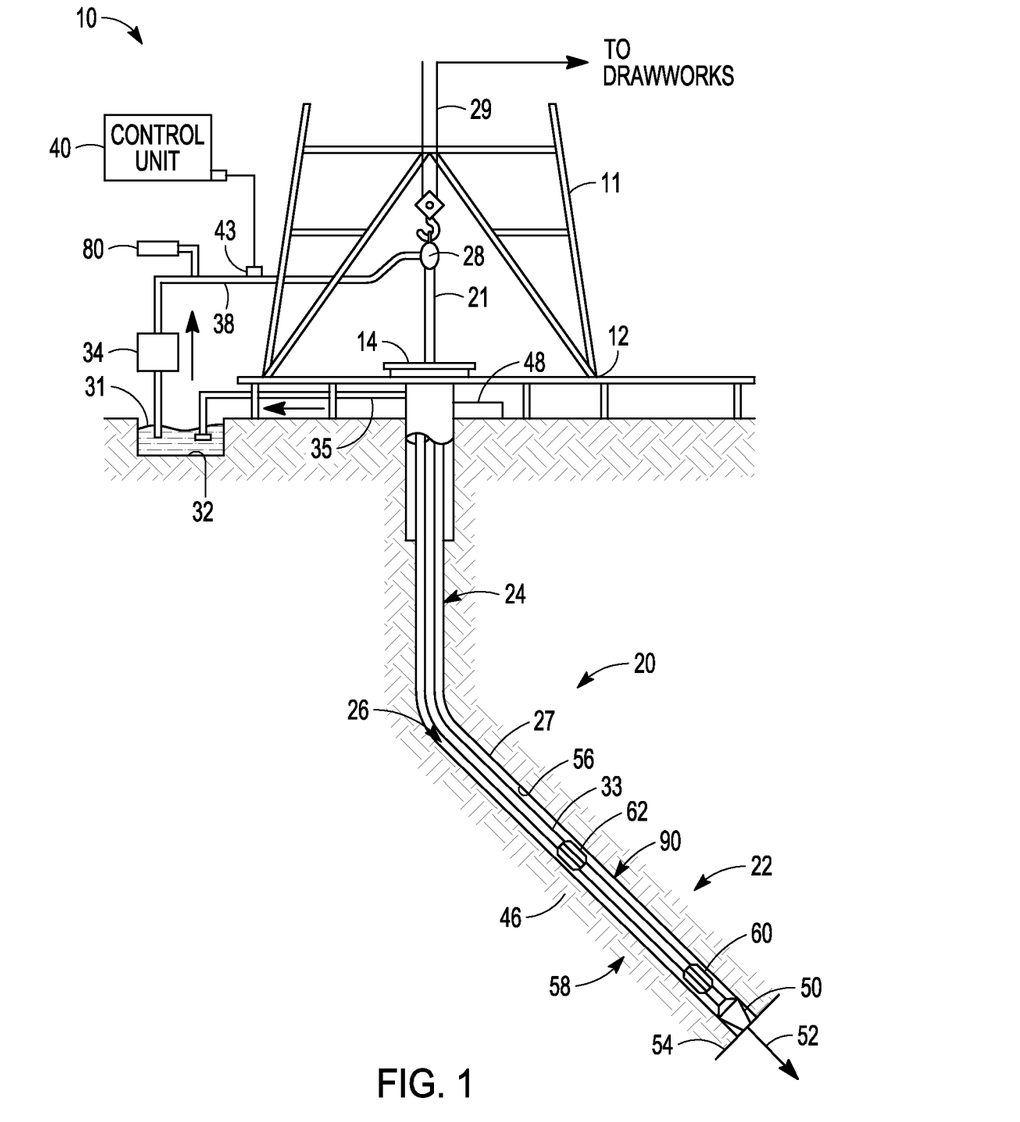
FIG. 1 is a schematic diagram of a downhole mud motor and associated drivetrain disposed in a well in one example operating environment.

Referring now to FIG. 1, that figure schematically depicts an example directional drilling system, indicated generally at 10, which includes a positive displacement—type mud motor assembly 90 as may benefit from use of the structures and methods described herein. Many of the disclosed concepts are discussed with reference to drilling operations for the exploration and/or recovery of subsurface hydrocarbon deposits, such as petroleum and natural gas. However, the disclosed concepts are not so limited, and can be applied to other drilling operations. To that end, the aspects of the present disclosure are not necessarily limited to the arrangement and components presented in FIG. 1. For example, many of the features and aspects presented herein can be applied in horizontal drilling applications and vertical drilling applications without departing from the intended scope and spirit of the present disclosure. In addition, it should be understood that the drawings are not necessarily to scale and are provided purely for descriptive purposes; thus, the individual and relative dimensions and orientations presented in the drawings are not to be considered limiting.

Directional drilling system 10 includes a derrick 11, supporting a derrick floor 12. Derrick floor 12 supports a rotary table 14 that is driven at a desired rotational speed, for example, via a chain drive system through operation of a prime mover (not depicted). The rotary table 14, in turn, provides the necessary rotational force to a drill string 20. The drill string 20, which includes a drill pipe section 24, extends downwardly from the rotary table 14 into a directional borehole 26. As illustrated in the Figures, the borehole 26 may travel along a multi-dimensional path or "trajectory." The three-dimensional direction of the bottom 54 of the borehole 26 of FIG. 1 is represented by a pointing vector 52.

A drill bit 50 is attached to the distal, downhole end of the drill string 20. When rotated, e.g., via the rotary table 14, the drill bit 50 operates to break up penetrate the geological formation 46. The drill string 20 is coupled through a kelly joint 21, swivel 28, and line 29 to a drawworks (not depicted). The drawworks may include various components, including a drum, one or more motors, a reduction gear, a main brake, and an auxiliary brake; and during a drilling operation can be operated to control the weight on bit 50 and the rate of penetration of the drill string 20 into the borehole 26. The structure and operation of such drawworks are generally known and are thus not described in detail herein.

During drilling operations, a suitable drilling fluid (commonly referred to in the art as drilling "mud") 31 can be circulated, under pressure, out of a mud pit 32 and into the borehole 26 through the drill string 20 by a hydraulic "mud pump" 34. The drilling fluid 31 may comprise, for example, water-based muds (WBM), which typically comprise one or more of a water-and-clay based composition; an oil-based mud (OBM), where the base fluid is a petroleum product, such as diesel fuel; or a synthetic-based mud (SBM), where the base fluid is a synthetic oil. Drilling fluid 31 passes from the mud pump 34 into the drill string 20 via a fluid conduit (commonly referred to as a "mud line") 38 and the kelly joint 21. Drilling fluid 31 is discharged at the borehole bottom 54 through an opening or nozzle in the drill bit 50, and circulates in an "uphole" direction towards the surface through the annulus 27 between the drill string 20 and the side of the borehole 26. As the drilling fluid 31 approaches the rotary table 14, it is discharged via a return line 35 into the mud pit 32. A variety of surface sensors 48, which are appropriately deployed on the surface of the borehole 26, operate alone or in conjunction with downhole sensors deployed within the borehole 26, to provide information about various drilling-related parameters, such as fluid flow rate, weight on bit, hook load, etc.

A surface control unit 40 may receive signals from surface and downhole sensors and devices via a sensor or transducer 43, which can be placed on the fluid line 38. The surface control unit 40 can be operable to process such signals according to programmed instructions provided to surface control unit 40. Surface control unit 40 may present to an operator desired drilling parameters and other information via one or more output devices 42, such as a display, a computer monitor, speakers, lights, etc., which may be used by the operator to control the drilling operations. Surface control unit 40 may contain a computer, memory for storing data, a data recorder, and other known and hereinafter developed peripherals. Surface control unit 40 may also include models and may process data according to programmed instructions, and respond to user commands entered through a suitable input device, which may be in the nature of a keyboard, touchscreen, microphone, mouse, joystick, etc.

In some embodiments of the present disclosure, the rotatable drill bit 50 is attached at a distal end of a steerable drilling bottom hole assembly (BHA) 22. In the illustrated embodiment, the BHA 22 is coupled between the drill bit 50 and the drill pipe section 24 of the drill string 20. The BHA 22 may comprise a Measurement While Drilling (MWD) System, designated generally at 58, with various sensors to provide information about the formation 46 and downhole drilling parameters. The MWD sensors in the BHA 22 may include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The MWD may also include additional/alternative sensing devices for measuring shock, vibration, torque, telemetry, etc. The above-noted devices may transmit data to a downhole transmitter 33, which in turn transmits the data uphole to the surface control unit 40. In some embodiments, the BHA 22 may also include a Logging While Drilling (LWD) System.

The BHA 22 can provide some or all of the requisite force for the bit 50 to break through the formation 46 (known as "weight on bit"), and provide the necessary directional control for drilling the borehole 26. In the embodiments illustrated in FIGS. 1 and 2, the BHA 22 may comprise a drilling motor 90 and first and second longitudinally spaced stabilizers 60 and 62. At least one of the stabilizers 60, 62 may be an adjustable stabilizer that is operable to assist in controlling the direction of the borehole 26. The drilling motor 90 will typically be in the form of a positive displacement-type mud motor driven by circulation of the drilling mud (and will subsequently be referred to here as a "mud motor").

Circulation of the drilling mud causes rotation of a rotor within the power section of the mud motor 90 relative to a stator of the motor. The operation of such a mud motor is well known to persons skilled in the art, and will not be further addressed here. In conventional such positive displacement-type mud motors, the rotor follows an orbital, or eccentric, rotational path relative to the stator, which is typically generally aligned with the axis of the drill string in the region proximate the mud motor power section. The mud motor power section is coupled to a motor transmission which provides the transition to other complements within the drill string. The motor transmission assembly includes a drivetrain which couples the eccentrically rotating rotor to a drive member rotating relative to a single axis, to facilitate rotation of a drill bit.

Figure 2:
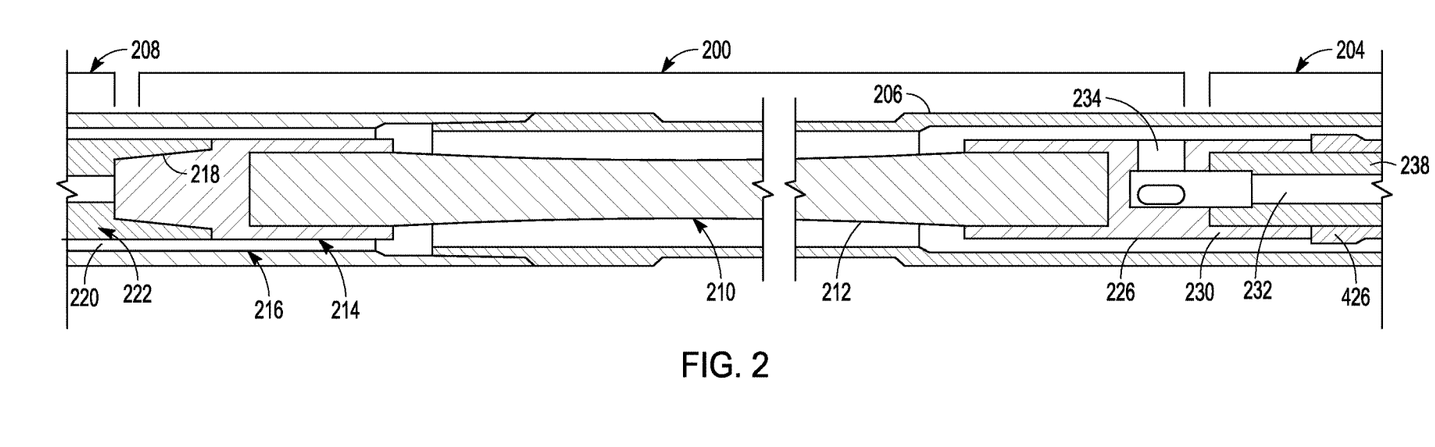
FIG. 2 is a cross-sectional drawing of a portion of a downhole motor drivetrain.

Referring now to FIG. 2, that figure shows a vertical section of a portion of a mud motor transmission assembly, indicated generally at 200. Transmission assembly 200 is coupled to a mud motor power section, a portion of which is indicated generally at 202; and extends to a bearing pack assembly, a portion of which is indicated generally at 204. Transmission assembly 200 includes an outer housing assembly 206, which couples to the external stator (not illustrated) of mud motor power section 202. Such coupling between outer housing assembly 206 and the external stator may be either direct, or through one or more intermediate components. Transmission assembly 200 also includes a rotating drivetrain including driveshaft assembly 210 which extends within outer housing 206.

Driveshaft assembly 210 includes a central shaft portion 212, and a first end portion, indicated generally at 214. First end portion 214 includes one portion of a first threaded coupling 216, which couples central shaft portion 212 to the rotor 220 of mud motor power section 202. In the depicted example, first end portion 214 includes a pin connection 218 configured to threadably couple into a box connection 222 of mud motor rotor 220. In many example constructions, box connection 222 will be a separate coupling fitting secured either directly to rotor 220 or to one or more intervening component(s) which in turn engage rotor 220. In some examples, the placement of the pin connection 218 and box connection 222 in first threaded coupling 216 may be reversed, such that the rotor (or rotor assembly) 220 terminates with the pin connection, and the central shaft portion 212 terminates with the box connection.

In some systems, it may be possible for driveshaft assembly 210 to be formed as a single structure. However, particularly for high torque applications, it will be preferable to form the driveshaft assembly 210 of at least two, and potentially three, components, as described herein. For high torque applications, a strong material, such as titanium, having a relatively low Elastic Modulus (i.e., Young's Modulus), is a desirable material for central shaft portion 212. However, due to its relatively low Elastic Modulus, titanium is less well suited to forming high-strength threaded connections in which the components preferably deform (e.g., elongate) in response to tightening of the threads. Accordingly, steel fittings with a relatively higher Elastic Modulus are preferable for forming the threaded connections. Many different steels may be utilized, but for example 41/45 and 43/30 steels are appropriate and beneficial materials for forming the threaded connections. Thus, as depicted in the figure, the first end portion 214 is formed as a separate coupling fitting coupled to central shaft portion 212 by any of various connection mechanisms, including shrink fitting to create an interference fit, welding, etc.

At the lower end of central shaft portion 212, is a second end portion 226, in which a coupling fitting 228 is coupled to central shaft portion 212 in the same manner that the previously discussed coupling fitting is attached to the upper end of central shaft portion 212. Coupling fitting 228 provides not only a box section 230 of a second threaded coupling, indicated generally at 232, but also defines a radial flow path 234 allowing the drilling mud within outer housing assembly 206 to flow not only around the exterior of driveshaft assembly 210 but also through a central bore 236 in a bearing shaft 238. Coupling fitting 228 and second threaded coupling 232 will be discussed in more detail relative to FIG. 4.

Figure 3A:
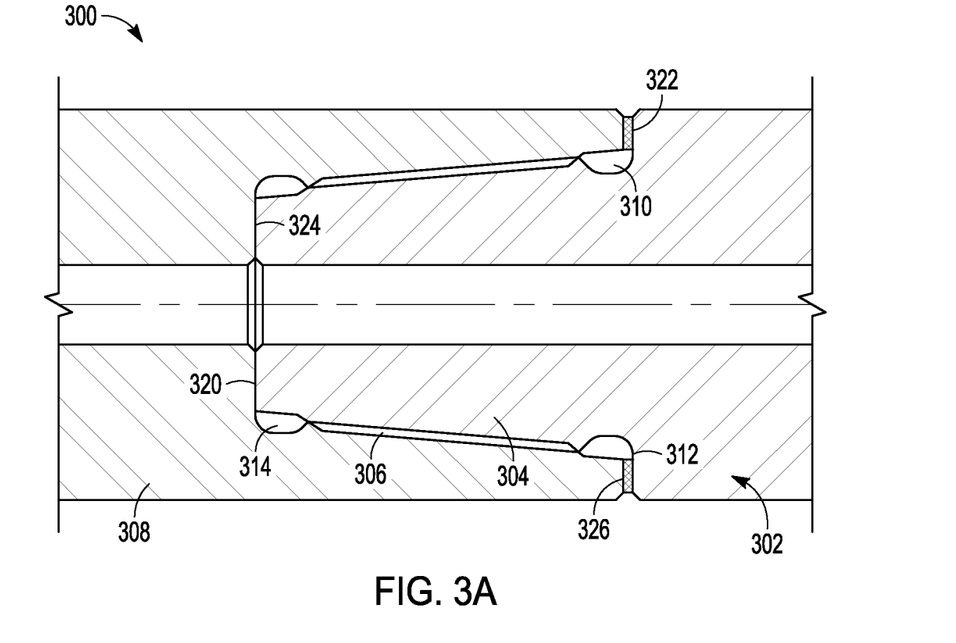
FIGS. 3A-B are each vertical section depictions of alternative configurations for a pin and box threaded coupling, as may be adapted for use as described herein.
Figure 3B:
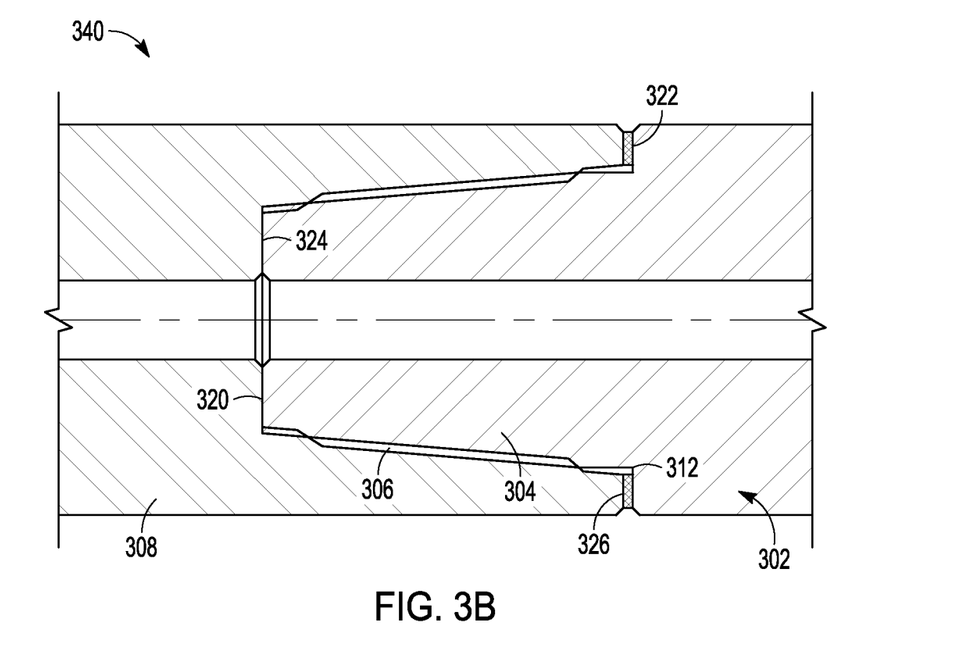

Referring now to FIGS. 3A-B, each figure represents a respective configuration for the first threaded coupling, as identified at 216 in FIG. 2. In threaded coupling 300 of FIG. 3A, a first coupling component 302 includes a pin section 304, which is threadably coupled at a threaded section 306 to a second coupling component 308 including box section 308. As is apparent from the figure, a first relief recess 310 is formed on pin section 304 relatively above the threaded section 306 and proximate a radially extending exterior shoulder 312 on first coupling component 302. Similarly, a second relief recess 314 is formed in box section 308, proximate the opposite extent of threaded section 306, adjacent to contact surface 320. In some examples, the threaded section 306 will be configured to be compatible with a selected industry standard, though such is not required for the functionality described herein.

Threaded coupling 300 may be referred to as a "double shoulder" coupling in which compression applied by tightening of the threads provides loading at two engagement regions on opposite sides of threaded section 306. This form of double shoulder connection increases the torsional capacity of the connection as a result of the increase in contact area between the threaded components. A first engagement region is formed by a radially inwardly extending shoulder forming a contact surface 320 at the bottom of box section 308 and adjacent end surface 324 of pin section 304. A second engagement region is formed between the exterior shoulder 312 on first coupling component 302 and the upper end 326 of box section 308. However, unlike the first engagement region, the second engagement region includes a spacer member 322 placed between exterior shoulder 312 on first coupling component 302, and upper end 326 of box section 308.

Spacer member 322 may be of a variety of configurations or materials suitable for carrying a compressive load between exterior shoulder 312 and upper end 326; and although described as a "member," it may be formed of multiple pieces which cooperatively define a "spacer member," as used herein. In most examples, spacer member 322 will be again formed of a suitable steel such as those identified for use in threaded coupling 300. Spacer member 322 is included to allow selective balancing of the compressive loads applied at the first and second engagement regions. Accordingly, pin section 304 and box section 308 are cooperatively formed such that when the two components are threaded together to an initial contact between contact surface 320 of box section 308 and end surface 324 of pin section 304 (i.e., at the first engagement region), a gap remains between exterior shoulder 312 and upper end 326 of box section 308. The dimensions of the gap may be selected for different applications, however it is currently envisioned that a gap on the order of 0.001 to 0.050 inch will be sufficient for threaded couplings in many mud motor transmission assemblies. For many example systems currently contemplated, the dimension of the gap will be within 0.001 and 0.015 inch. The selected dimension of the gap should allow insertion of a spacer member 322 of a selected dimension to effectively adjust the distance between contact surface 320 of box section 308 and exterior shoulder 312 of pin section 304. The adjustment of this distance facilitates balancing the loading applied between pin section 304 and box section 308 at each of the first and second engagement regions once the threaded coupling is torqued to a desired level. Thus, depending upon the dimension of the gap, spacer member 322 may have a maximum dimension that can be slightly larger than the measured gap. Thus, where the measured gap is within the range of 0.001 to 0.015 inch, the selected spacer might have a dimension within the range of 0.001 to 0.025 inch, for example.

Referring now to FIG. 3B, that figure depicts a threaded coupling 340 configured similarly to threaded coupling 300 of FIG. 3A. Accordingly, elements configured essentially identically to those of threaded coupling 300 have been identified with the same reference numerals. Threaded coupling 340 differs from threaded coupling 300 only in that the two relief recesses of threaded coupling 300, indicated in FIG. 3A at 310 in pin section 304, and at 314 in box section 308, are eliminated. In general, a threaded coupling of the design of FIG. 3B may have the potential to have stress points that can be avoided with a threaded coupling of the design of FIG. 3A. Although both example threaded couplings 300, 340 shown in FIGS. 3A-B present a tapered threaded connection, as will be discussed in reference to FIG. 4, a straight, or non-tapered, threaded connection may be utilized instead.

Figure 4:
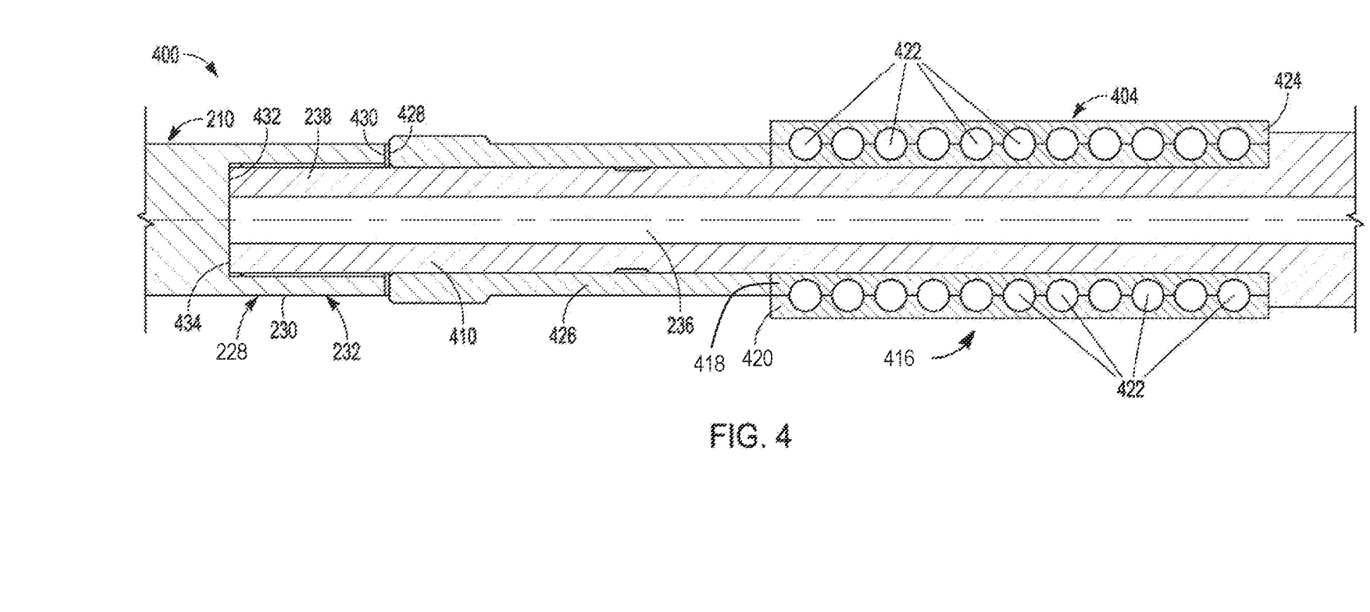
FIG. 4 is a cross-sectional drawing of a lower portion of a mud motor drivetrain assembly depicting an alternative configuration of coupling in accordance with the present disclosure.

Referring now to FIG. 4, that figure depicts a lower portion 400 of the mud motor drive train from a lower end of the driveshaft assembly 210 (the upper end of which was discussed in reference to FIG. 2), and extending through the bearing assembly, indicated generally at 404. Lower portion 400 extends within a housing (not illustrated).

As discussed in reference to FIG. 2, the lower end of the driveshaft assembly 210 includes a coupling fitting 228, which defines a box section 230 of a second threaded coupling 232. In the depicted example, bearing shaft 238 is arranged to require minimal, if any, eccentric rotation proximate threaded coupling 232 during use. As a result, bearing shaft 238 can be constructed of a material such as the described steels, for example, that have an Elastic Modulus better suited to use in threaded couplings than the titanium described for use in driveshaft 212. As a result, in the example configuration depicted, bearing shaft 238 extends to a pin section 410 configured to engage box section 230 of second threaded coupling 232. As previously described relative to FIG. 2, the attachments of pin section 410 and box section 230 to components on either side of threaded coupling 232 can be reversed.

A bearing assembly, indicated generally at 416, extends circumferentially around a portion of bearing shaft 238. Bearing assembly 416 includes an inner bearing sleeve 418 and an outer bearing sleeve 420 retaining a plurality of bearing elements indicated generally at 422 (the labeled bearing elements are typical for each of the schematically depicted bearing elements). Outer bearing sleeve 420 will be supported by an exterior housing (not illustrated). Bearing elements 422 can be of any desired configuration suitable for facilitating the rotation of bearing shaft 238 relative to essentially a single longitudinal axis. Inner bearing sleeve 418 is retained against a radial externally extending shoulder 424 of bearing shaft 238. Thus, shoulder 424 of bearing shaft 238 establishes a bearing receiving area around bearing shaft 238 and extending to threaded coupling 232. In many example systems, shoulder 424 will be an integral portion of bearing shaft 238 (i.e., the two structures will be machined or otherwise formed as a single structure). However, such integral formation is not required, and shoulder 424 may be formed as a separate structure which is then secured in a desired relation to bearing shaft 238.

A bearing spacer sleeve 426 extends circumferentially to bearing shaft 238 and between threaded coupling 232 and inner bearing sleeve 418. Also extending around bearing shaft 238 is a spacer 428 placed adjacent upper shoulder 430 of threaded coupling 232. When lower portion 400 is assembled, with threaded coupling 232 torqued to a selected level, compression is applied from shoulder 424 of bearing shaft 238, through inner bearing sleeve 418, bearing spacer sleeve 426 and precision spacer 428 against upper shoulder 430. This compression serves dual purposes of providing a preload on bearing assembly 416 and also controlling the relative loading: at threaded coupling 232, between bearing spacer sleeve 426 and upper shoulder 430 of box section 230; and also between end surface 432 of pin section 412 and adjacent bottom surface 434 of box section 230.

As can be seen from consideration of FIG. 4, both bearing spacer sleeve 426 and spacer 428 serve a spacing function within the bearing receiving area, and therefore may each be considered as a respective "spacer." For that reason, the term "precision spacer" (428) is used in reference for the spacer that will be selected for adjusting of the remaining gap once a bearing spacer sleeve (if present) and/or any additional structures in the bearing receiving area are in place.

In order to achieve this load control functionality, the dimensions of inner bearing sleeve 418 and bearing spacer sleeve 426 will be selected such that when the lower end assembly is initially assembled with the engagement of pin section 412 and box section 230 to essentially a "finger tight" engagement, a gap remains between bearing spacer sleeve 426 and upper shoulder 430. As with the threaded coupling 300 of FIG. 3A, for many downhole motor configurations, this gap will be approximately 0.001 to 0.050 inch, with a gap of between 0.001 and 0.015 inch being preferable for many contemplated systems. The dimension of precision spacer 428 will then be selected to provide the desired preload on bearing assembly 416 and between bearing spacer sleeve 426 and upper shoulder 430, as described earlier herein. The dimension of precision spacer 428, may in some systems have a dimension within the range of 0.001 to 0.025 inch, as described relative to spacer 228 in FIG. 2.

Figure 5:
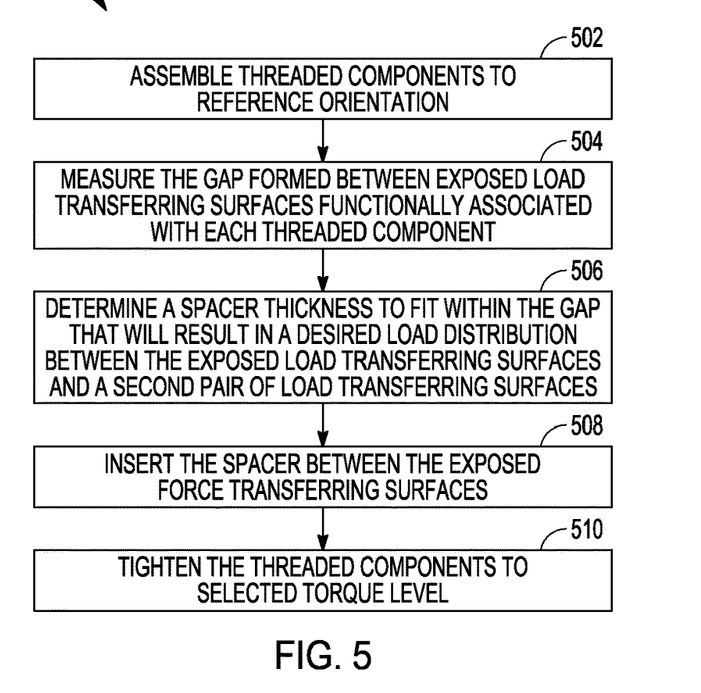
FIG. 5 is a flow chart depicting an example method for assembling a transmission drivetrain having components as discussed in reference to any of FIGS. 2-4.

Referring now to FIG. 5, the figure depicts a flowchart of a method 500 of assembling a mud motor drivetrain assembly incorporating connection mechanisms as described herein. A first step of method 500 is to assemble the threaded components to a reference orientation, as indicated at 502. In many examples, this will involve tightening the threaded components to a point where two contact surfaces of the threaded coupling make initial contact (as would normally be characterized as "finger tight," notwithstanding the fact that the described components may be of a size and/or weight that precludes such hand assembly). For example, as can easily be seen in reference to FIG. 3A, end surface 324 of pin section 304 will initially contact bottom surface 320 of box section 308 when the two threaded components are connected, due to the cooperative configuration of the components to leave a gap 312 between the two components under such conditions. As will be apparent from the discussion of FIG. 4 above, the force transferring surfaces are not always those directly associated with the two threaded members. As discussed relative to FIG. 4, although compressive load from bearing shaft 238 terminating in the pin section is applied from radially extending shoulder 424, that compressive load is transferred through inner bearing sleeve 418 and bearing spacer sleeve 426, and through spacer 428 (when installed), to upper shoulder 430.

The next step, as indicated at 504, is to measure the gap that remains between load transferring surfaces operatively associated with each threaded component. With a structure such as threaded coupling 216 as discussed relative to FIG. 2, the surfaces defining the gap are adjacent one another. However, in a structure as discussed relative to FIG. 4, where the compressive load resulting from tightening of threaded coupling 232 is transferred through the described multiple components, the surfaces that connect those components under load are all load transferring surfaces that ultimately are each associated with one or the other of the threaded members, depending upon where the gap remains. In most cases, it will be preferable to bias the components appropriately toward one or the other of the threaded members such that only a single gap exists in a selected location, thereby easing the measurement. The gap can be measured by precision measurement tools, such as, for example, feeler gauges or digital calipers, etc.

The next step, as indicated at 506, involves determining a spacer thickness to fit within the measured gap, such that when the threaded coupling is torqued to a selected level, the relative loading between a first pair of load transferring surfaces and a second pair of load transferring surfaces will generally have a desired load relative to one another. In many examples, reference measurements will have been made for the threaded coupling to facilitate making this determination. For example, a reference coupling of the same dimensions and materials may be used to generate empirical measurements of loads at each contact shoulder which may be used as a reference for identifying the appropriate spacer thickness to achieve the desired load balance, under specified torque conditions. In other methodologies, the spacer thickness may be determined in reference to mathematical evaluation of the foreseeable properties of the threaded coupling when under load to determine a spacer thickness.

Once the desire spacer thickness is selected, the spacer will be inserted between the exposed load transferring surfaces, as indicated at 508. In many examples, the spacer will be formed of one or more concentric rings of known thicknesses, which will extend around and coaxially with the pin section of the threaded coupling. Finally, as indicated at 510, the threaded components will be tightened to a selected torque level. Preferably, this will be the same torque level as was taken into consideration (either directly or through reference to empirical measurements) when the spacer thickness was selected.

Figure 6:
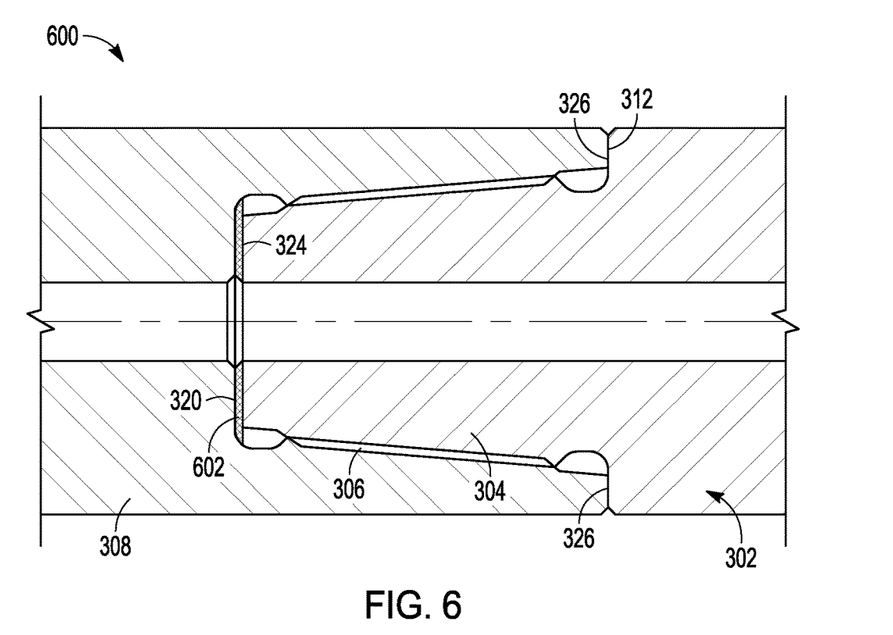
FIG. 6 is a cross-sectional drawing of a threaded coupling suitable for use in a mud motor drivetrain, having an alternative placement for a spacer.

FIG. 6 is a cross-sectional view of another alternative configuration for a threaded coupling 600 suitable for use in the above-described mud motor transmission structures. FIG. 6 is again similar to the threaded couplings 300, 340 of FIGS. 3A-B, and analogous components have been numbered similarly. Threaded coupling 600 differs from threaded couplings 300 and 340 in the placement of the spacer 602. Rather than the spacer being placed between upper end 304 of box section 308 and external shoulder 312 of pin section 304, as was spacer 322 in FIGS. 3A-B, spacer 602 is placed between contact surface 320 at the bottom of box section 308 and end surface 324 of pin section 304. In this placement, the spacer serves the same function of adjusting the effective dimensions of the pin and box coupling so as to adjust the loading in each of the first and second engagement areas. With the structure of threaded coupling 600, initial assembly of the coupling without a spacer 602 will not leave an exposed gap which can be measured as easily. As a result, determining the correct dimension for spacer 602 may be a more iterative process than is required with either of threaded couplings 300 or 340, in order to achieve a desired force loading "balance" between the first and second engagement areas. In yet another alternative configuration, a threaded coupling may include two spacers, with a first spacer in the position of spacer 602, in the first engagement area between contact surface 320 and in the surface 324 of pin 304, and may also include a spacer in the second engagement area, between upper end 304 of box section 308 and external shoulder 312 of pin section 304, as (i.e., in the position of spacer 322 in FIGS. 3A-B).

Many variations may be made in the structures and techniques described and illustrated herein without departing from the scope of the inventive subject matter. Accordingly, the scope of the inventive subject matter is to be determined by the scope of the following claims and all additional claims supported by the present disclosure, and all equivalents of such claims.

We claim:

1. A method of assembling a downhole motor transmission assembly, comprising:
   attaching a drive shaft assembly to the rotor assembly of a downhole motor through use of a first pin and box coupling, wherein the drive shaft assembly includes a first portion of the first pin and box coupling at a first end thereof, and the rotor assembly includes a second portion of the first pin and box coupling at a first end thereof;
   wherein the first pin and box coupling defines a first engagement area between the end of a threaded pin section and an internal shoulder within the threaded box section, and further defines a second engagement area between an external shoulder of the pin section and an upper end of the box section, and wherein dimensions of the threaded pin section and the threaded box section are configured to provide a gap at either the first engagement area or the second engagement area;
   placing a spacer member in either the first engagement area or the second engagement area, between the pin and box portions of the first pin and box coupling, the spacer member sized to cause a desired load balance between the first engagement area and the second engagement area.

2. The method of claim 1, wherein the dimensions of the threaded pin section and the threaded box section are configured to provide a gap at the second engagement area; and wherein the spacer is placed in the gap between the external shoulder of the pin section and the upper end of the box section of the first pin and box coupling.

3. The method of claim 1, further comprising:
   assembling the first pin and box coupling to a selected degree of threaded coupling;
   measuring the gap remaining between the external shoulder of the pin section and the upper end of the box section when the end of the threaded pin section contacts the internal shoulder within the threaded box section; and
   selecting a dimension of the spacer in reference to the measured gap.

4. The method of claim 1, wherein the spacer member is sized to cause a desired load balance between the first engagement area and the second engagement area based on a reference load measurement.

5. The method of claim 1, wherein the spacer member is sized to cause a desired load balance between the first engagement area and the second engagement area based on a reference load measurement under specified torque conditions.

6. The method of claim 1, wherein the spacer member is sized to cause a desired load balance between the first engagement area and the second engagement area based on a mathematical evaluation of properties of the threaded coupling when under load.

7. A downhole motor drive mechanism, comprising:
   a driveshaft assembly having a coupling portion having a first portion of a first pin and box coupling at a first end thereof;
   a motor drive member having a second portion of the first pin and box coupling at a first end thereof; and
   a spacer;
   wherein the first pin and box coupling defines a first engagement area between the end of a threaded pin section and an internal shoulder within the threaded box section, and further defines a second engagement area between an external shoulder of the pin section and the end of the box section, and wherein dimensions of the threaded pin section and the threaded box section are configured to provide a gap at the second engagement area; and
   wherein the spacer is placed in the gap at the second engagement area, and is sized to cause a desired load balance between the first engagement area and the second engagement area.

8. The downhole motor drive mechanism of claim 7, wherein the driveshaft assembly further comprises a first portion of a second pin and box coupling at a second end thereof.

9. The downhole motor drive mechanism of claim 8, further comprising:
   a bearing assembly, including, a bearing shaft having a second portion of the second pin and box coupling, the bearing shaft defining a bearing receiving area around the bearing shaft and above a shoulder associated with the bearing shaft;

a bearing sleeve extending around the bearing shaft in the bearing receiving area; and at least one spacer member also extending around the bearing shaft in the bearing receiving area;

wherein dimensions of the second portion of the second pin and box coupling section and also of the bearing receiving area are configured to provide a gap in the bearing receiving area in the absence of at least one spacer member; and wherein dimensions of the at least one spacer member are selected to eliminate the gap and to establish a desired preload on the bearing assembly when the second pin and box coupling is tightened to a selected torque level.

10. The downhole motor drive mechanism of claim 7, wherein the spacer is sized to cause a desired load balance between the first engagement area and the second engagement area based on a reference load measurement.

11. The downhole motor drive mechanism of claim 7, wherein the spacer is sized to cause a desired load balance between the first engagement area and the second engagement area based on a reference load measurement under specified torque conditions.

12. The downhole motor drive mechanism of claim 7, wherein the spacer is sized to cause a desired load balance between the first engagement area and the second engagement area based on a mathematical evaluation of properties of the threaded coupling when under load.

13. A downhole motor drive mechanism, comprising:
a transmission section, the transmission section including a driveshaft assembly having a first portion of a first pin and box coupling at a lower end thereof;
a bearing section coupled to a lower end of the transmission section, the bearing section comprising,
a bearing shaft having a second portion of the first pin and box coupling, the bearing shaft defining a bearing receiving area around the bearing shaft and above a shoulder associated with the bearing shaft;
a bearing sleeve extending around the bearing shaft in the bearing receiving area; and
at least one spacer member also extending around the bearing shaft in the bearing receiving area;
wherein dimensions of the first pin and box coupling section and also of the bearing receiving area are configured to provide a gap in the bearing receiving area in the absence of at least one spacer member; and
wherein dimensions of the at least one spacer member are selected to eliminate the gap and to establish a desired preload on the bearing assembly when the second pin and box coupling is tightened to a selected torque level.

14. The downhole motor drive mechanism of claim 13, wherein the at least one spacer member comprises a bearing spacer sleeve and a precision spacer, the precision spacer having a dimension between 0.001 and 0.050 inch.

15. The downhole motor drive mechanism of claim 13, wherein the bearing shaft shoulder is an integral portion of the bearing shaft.

16. The downhole motor drive mechanism of claim 13, wherein the bearing shaft shoulder is formed as a separate member from the bearing shaft, and is secured in a desired relation to the bearing shaft.

17. The downhole motor drive mechanism of claim 13, wherein the dimensions of the at least one spacer member are selected to establish a desired preload on the bearing assembly when the second pin and box coupling is tightened to a selected torque level based on a reference load measurement.

18. The downhole motor drive mechanism of claim 13, wherein the dimensions of the at least one spacer member are selected to establish a desired preload on the bearing assembly when the second pin and box coupling is tightened to a selected torque level based on a reference load measurement under specified torque conditions.

19. The downhole motor drive mechanism of claim 13, wherein the dimensions of the at least one spacer member are selected to establish a desired preload on the bearing assembly when the second pin and box coupling is tightened to a selected torque level based on a mathematical evaluation of properties of the threaded coupling when under load.

20. A downhole motor drive mechanism, comprising:
a housing assembly having a first threaded section to couple the housing assembly to a stator of the downhole motor through use of a first threaded coupling; and
a driveshaft assembly extending within the housing assembly, the driveshaft assembly having a shaft portion and a second threaded section to threadably couple to a mating threaded section of a rotor of the downhole motor at a second threaded coupling, wherein the shaft portion is formed of a material having a first elastic modulus, and wherein the second threaded section is formed of a material having a second elastic modulus which is greater than the first elastic modulus of the shaft portion, and wherein the second threaded coupling includes first and second engagement shoulders; and
a spacer component that extends circumferentially around a portion of the second threaded coupling at the first engagement shoulder, and is compressed between the second threaded section and the rotor of the downhole motor, the spacer sized to establish a desired load balance between the first and second engagement shoulders when the second threaded coupling is torqued to a desired level.

21. The downhole motor drive mechanism of claim 20, wherein the spacer is sized to establish a desired load balance between the first and second engagement shoulders when the second threaded coupling is torqued to a desired level based on a reference load measurement.

22. The downhole motor drive mechanism of claim 20, wherein the spacer is sized to establish a desired load balance between the first and second engagement shoulders when the second threaded coupling is torqued to a desired level based on a reference load measurement under specified torque conditions.

23. The downhole motor drive mechanism of claim 20, wherein the spacer is sized to establish a desired load balance between the first and second engagement shoulders when the second threaded coupling is torqued to a desired level based on a mathematical evaluation of properties of the threaded coupling when under load.

* * * * *